United States Patent [19]

Cobbett et al.

[11] Patent Number: 5,799,278

[45] Date of Patent: Aug. 25, 1998

[54] SPEECH RECOGNITION SYSTEM AND METHOD USING A HIDDEN MARKOV MODEL ADAPTED TO RECOGNIZE A NUMBER OF WORDS AND TRAINED TO RECOGNIZE A GREATER NUMBER OF PHONETICALLY DISSIMILAR WORDS.

[75] Inventors: Michael Cobbett, Eastleigh; John Brian Pickering, Winchester, both of United Kingdom

[73] Assignee: International Business Machines Corporation, Armonk, N.Y.

[21] Appl. No.: 673,862

[22] Filed: Jul. 2, 1996

[30] Foreign Application Priority Data

Sep. 15, 1995 [GB] United Kingdom ............... 9518949

[51] Int. Cl.$^6$ ........................................... G10L 5/00
[52] U.S. Cl. ........................... 704/256; 704/3; 704/232
[58] Field of Search ........................... 395/2.54, 2.53, 395/2.52, 2.65, 2.64, 2.86, 2.6, 2.51, 2.66, 2.44, 2.59, 759, 77, 23, 20; 704/232, 236, 200

[56] References Cited

U.S. PATENT DOCUMENTS

| | | | |
|---|---|---|---|
| 5,046,099 | 9/1991 | Nishimura | 395/2.65 |
| 5,502,791 | 3/1996 | Nishimura et al. | 704/256 |
| 5,526,465 | 6/1996 | Carey et al. | 395/2.59 |
| 5,572,624 | 11/1996 | Sejnoha | 395/2.65 |
| 5,615,301 | 3/1997 | Rivers | 395/2.86 |

FOREIGN PATENT DOCUMENTS

WO 92/06468 4/1992 WIPO ............... G10L 5/06

*Primary Examiner*—David R. Hudspeth
*Assistant Examiner*—Donald L. Storm

[57] ABSTRACT

A speech recognition system for discrete words uses a single Hidden Markov Model (HMM), which is nominally adapted to recognise N different isolated words, but which is trained to recognise M different words, where M>N. This is achieved by providing M sets of audio recordings, each set comprising multiple recordings of a respective one of said M words being spoken. Only N different labels are assigned to the M sets of audio recordings, so that at least one of the N labels has two or more sets of audio recordings assigned thereto. These two or more sets of audio recordings correspond to phonetically dissimilar words. The HMM is then trained by inputting each set of audio recordings and its assigned label. The HMM can effectively compensate for the phonetic variations between the different words assigned the same label, thereby avoiding the need to utilise a larger model (i.e., to use M labels).

13 Claims, 4 Drawing Sheets

| N | $M_1$ | $M_2$ | ... | $M_K$ |
|---|---|---|---|---|
| N(1) | $M_1(1)$ | $M_2(1)$ | | $M_K(1)$ |
| N(2) | $M_1(2)$ | $M_2(2)$ | | $M_K(2)$ |
| N(3) | $M_1(3)$ | $M_2(3)$ | | $M_K(3)$ |
| N(4) | $M_1(4)$ | $M_2(4)$ | | $M_K(4)$ |
| N(5) | $M_1(5)$ | $M_2(5)$ | | $M_K(5)$ |
| N(6) | $M_1(6)$ | $M_2(6)$ | | $M_K(6)$ |
| N(7) | $M_1(7)$ | $M_2(7)$ | | $M_K(7)$ |
| N(8) | $M_1(8)$ | $M_2(8)$ | | $M_K(8)$ |
| N(9) | $M_1(9)$ | $M_2(9)$ | | $M_K(9)$ |
| ⋮ | ⋮ | ⋮ | | ⋮ |
| N(i) | $M_1(i)$ | $M_2(i)$ | | $M_K(i)$ |

M

| N | $M_1$ | $M_2$ | ... | $M_K$ |
|---|---|---|---|---|
| $N(1)$ | $M_1(1)$ | $M_2(1)$ | | $M_K(1)$ |
| $N(2)$ | $M_1(2)$ | $M_2(2)$ | | $M_K(2)$ |
| $N(3)$ | $M_1(3)$ | $M_2(3)$ | | $M_K(3)$ |
| $N(4)$ | $M_1(4)$ | $M_2(4)$ | | $M_K(4)$ |
| $N(5)$ | $M_1(5)$ | $M_2(5)$ | | $M_K(5)$ |
| $N(6)$ | $M_1(6)$ | $M_2(6)$ | | $M_K(6)$ |
| $N(7)$ | $M_1(7)$ | $M_2(7)$ | | $M_K(7)$ |
| $N(8)$ | $M_1(8)$ | $M_2(8)$ | | $M_K(8)$ |
| $N(9)$ | $M_1(9)$ | $M_2(9)$ | | $M_K(9)$ |
| ⋮ | ⋮ | ⋮ | | ⋮ |
| $N(i)$ | $M_1(i)$ | $M_2(i)$ | | $M_K(i)$ |

$\underbrace{\qquad\qquad\qquad}_{M}$

FIG. 6A

| QUESTION | RESPONSES | | |
|---|---|---|---|
| SIZE | SMALL | MEDIUM | LARGE |
| COLOUR | RED | BLUE | GREEN |

FIG. 6B

SPEECH RECOGNITION SYSTEM AND METHOD USING A HIDDEN MARKOV MODEL ADAPTED TO RECOGNIZE A NUMBER OF WORDS AND TRAINED TO RECOGNIZE A GREATER NUMBER OF PHONETICALLY DISSIMILAR WORDS.

FIELD OF INVENTION

The present invention invention relates to a speech recognition system, and more particularly to a speech recognition system which uses a Hidden Markov Model (HMM) for the recognition of discrete words.

BACKGROUND OF THE INVENTION

In recent years it has become very popular to use Hidden Markov Models (HMMs) to perform speech recognition. An HMM has a number of states, which it transfers between in a statistically determined fashion. FIG. 1 gives an example of a simple HMM having N states, (S(1), S(2), .... S(N)). The probability of transferring from one particular state to another particular state can be specified in an N by N matrix (generally denominated as $A_{ij}$ in which element aiI represents the probability of transferring from state i to state j.

FIG. 1 illustrates how the values of $a_{ij}$ are associated with transitions between states (note that FIG. 1 only shows a subset of the possible transitions). For the HMMs normally used in speech recognition, $a_{ij}=0$ for j<i, and it may be additionally specified that the model is initially in state S(l). In terms of FIG. 1, this implies that the model starts on the far left, and state transitions only proceed from left to right; there are no state transitions which operate in the reverse direction. It is common however, for models to permit self-transitions to occur, i.e., a transition which starts and ends at the same node. Thus $a_{ii}$ may be non-zero. An example of a self-transition is shown for S(2) in FIG. 1.

In a "hidden" Markov model, the state transitions cannot be directly observed. Instead the model produces a series of outputs or observations, $(O_1, O_2, .... O_r, ..)$. Like the state transitions, the outputs are also produced in a statistically determined fashion, and follow a probability distribution B(O), where B generally depends only on the current state of the model. The output probability distribution for state S(i) can therefore be written as $B_{S(i)}(O)$, with B now being used to represent the set of $B_{S(i)}(O)$ for all states. Note that B may represent either a discrete probability distribution, in which case there is a fixed set of possible outputs, or alternatively B may represent a continuous probability distribution.

An HMM is therefore specified by N, the number of states, A, the transition probability matrix, B, the set of output probabilities, plus a paramater $\pi_{S(i)}$, which represents the probability that the HMM is initially in state S(i). In speech applications it is commonly specified that the HMM initially starts in state S(1), in other words, $\pi_{S(i)}=1$ for i=1; $\pi_{S(i)}=0$ for i≠1 .

Many HMMs are structured so that there are regular transitions, with an output being produced for each transition. In such a model, it is possible to regard the outputs as being actually produced by the transitions. This sort of model often includes the possibility of a zero or null output for a transition.

In a somewhat different type of HMM, the duration in a particular state is controlled by some external (possibly variable) parameter, after which the model transfers to another state (in general this type of HMM does not permit self-transitions). The number of outputs produced whilst in a particular state depends on the duration of stay in that state. This type of HMM has the advantage that it is possible to force an exit from the model within a finite time (useful for modelling real-life processes); otherwise, an HMM theoretically may never exit from a state for which self-transitions are allowed (thus in the example of FIG. 1, the model may get stuck in state S(2)).

Further details about HMMs, particularly in speech applications, can be found in "A tutorial on Hidden Markov Models and Selected Applications in Speech Recognition" by L Rabiner, p257–286, Proceedings of the IEEE, Vol 77, Number 2, February 1989; "Hidden Markov models for automatic speech recognition: theory and application" by S J Cox, p105–115, British Telecom Technological Journal, Vol 6, Number 2, April 1988, and "Hidden Markov Models for Speech Recognition" by X Huang, Y Ariki, and M Jack, Edinburgh University Press, 1990 (ISBN 0 7486 0162 7).

If we now consider the use of HMMs in more detail, FIG. 2 illustrates an example of an HMM which has four states. States 1 and 4 are only capable of producing a single output, which can be designated Z, and which we can equate with silence. States 2 and 3 are each capable of producing two different outputs, which can be designated X and Y. The model only supports left-to-right (plus self) transitions, so that in order to produce a meaningful (i.e., non-silent) output, which we will presume is bounded by silence, the model must start in state 1 and terminate in state 4.

We will discuss the HMM of FIG. 2 with reference to two different sets of A and B matrices (i.e., transition and output probabilities), which will be referred to as Model 1 and Model 2. The assumed values of the A and B matrices for these two models are:

Model 1:

$$A = \begin{pmatrix} 0 & \frac{1}{3} & \frac{2}{3} & 0 \\ 0 & \frac{1}{2} & \frac{1}{4} & \frac{1}{4} \\ 0 & 0 & \frac{3}{4} & \frac{1}{4} \\ 0 & 0 & 0 & 1 \end{pmatrix} \quad B = \begin{pmatrix} \frac{2}{3} & \frac{1}{3} \\ \frac{1}{3} & \frac{2}{3} \end{pmatrix}$$

Model 2:

$$A = \begin{pmatrix} 0 & \frac{3}{4} & \frac{1}{4} & 0 \\ 0 & \frac{1}{3} & \frac{1}{3} & \frac{1}{3} \\ 0 & 0 & \frac{1}{4} & \frac{3}{4} \\ 0 & 0 & 0 & 1 \end{pmatrix} \quad B = \begin{pmatrix} \frac{1}{2} & \frac{3}{4} \\ \frac{1}{2} & \frac{1}{4} \end{pmatrix}$$

where for the B matrices, the columns represent states 2 and 3 respectively, and the top and bottom rows represent outputs X and Y respectively (so that for example the top left value represents the probability of getting output X in state 2).

Now let us assume that we observe an output ZXXZ (from now on we will simply assume the initial and final "Z"s, and simply designate this as "XX"). There are three different routes through the HMM that can produce this output. Listed below are the different routes with their corresponding probabilities for each of the routes in the two different models:

Model 1:

$R1 \quad 1 \to 2 \to 2 \to 4: \quad \left(\frac{1}{3} \times \frac{2}{3}\right) \times \left(\frac{1}{2} \times \frac{2}{3}\right) \times \frac{1}{4} = \frac{1}{54}$ $R2 \quad 1 \to 2 \to 3 \to 4: \quad \left(\frac{1}{3} \times \frac{2}{3}\right) \times \left(\frac{1}{4} \times \frac{1}{3}\right) \times \frac{1}{4} = \frac{1}{162}$ $R3 \quad 1 \to 3 \to 3 \to 4: \quad \left(\frac{2}{3} \times \frac{1}{3}\right) \times \left(\frac{3}{4} \times \frac{1}{3}\right) \times \frac{1}{4} = \frac{1}{72}$ Model 2:

$R1 \quad 1 \to 2 \to 2 \to 4: \quad \left(\frac{3}{4} \times \frac{1}{2}\right) \times \left(\frac{1}{3} \times \frac{1}{2}\right) \times \frac{1}{3} = \frac{1}{48}$ $R2 \quad 1 \to 2 \to 3 \to 4: \quad \left(\frac{3}{4} \times \frac{1}{2}\right) \times \left(\frac{1}{3} \times \frac{3}{4}\right) \times \frac{3}{4} = \frac{9}{128}$ $R3 \quad 1 \to 3 \to 3 \to 4: \quad \left(\frac{1}{4} \times \frac{1}{2}\right) \times \left(\frac{1}{4} \times \frac{3}{4}\right) \times \frac{3}{4} = \frac{9}{512}$ Note that the probabilities are simply obtained by sequentially multiplying together, for each output in turn, the probability of arriving at a new state (from the specified previous state) and the probability of the new state producing the specified output, assuming that all the probabilities are independent of one another.

The above example can be used to illustrate some of the calculations typically performed with HMMs. Thus one common question is given a particular HMM and output, what is the most probable state sequence that produced this output. In the above example, we can see that for Model 1, the output XX was most probably produced by Route 1 (1→2→2→4), whereas for Model 2, the output XX was most probably produced by Route 2 (1→2→3→4). Another question is what is the overall probability that a particular output was produced by a particular HMM. In the above example we can see that the probability that output XX is produced in Model 1 is 25/648 (≈0.0386), whereas the probability that the output XX is produced in Model 2 is 167/1536 (≈0.109).

The probability calculations outlined above are widely used in speech applications, for example to discriminate between different candidate words in a speech recognition system. Thus a typical such system is described in U.S. Pat. No. Re-issue 33,597, in which an HMM is used to recognise a limited set of individual words (such as the digits from "one" to "nine"). An HMM model having 5 states is provided for each word in the set, each HMM model being associated with one digit to be recognised. The audio signals for each digit are represented as successive audio vectors, with a set of 64 possible different audio vectors. Thus for each state, the B matrix contains the output probabilities for all of these 64 different vectors (of course, some vectors may perhaps have zero output probability from some states).

In U.S. Pat. No. Re 33,597, when a spoken, initially unknown, digit is to be recognised, the incoming digitised audio signal is first divided into a sequence of frames, each having a duration of say 10 ms. Each frame is then represented by an audio vector taken from the set of 64 audio vectors, a process known as vector quantisation. There are standard techniques available for this approximation of a continuous signal to a series of vectors from a limited vocabulary. For each model (i.e., for each digit), the state sequence most likely to produce the sequence of audio vectors is determined, along with its corresponding probability. This is analagous to selecting Route 1 from Model 1 and Route 2 for Model 2 for the output XX in the example described above. Note that there are well-known algorithms available for performing this calculation quickly and efficiently. This results in a set of probabilities, one probability for each possible digit/model, representing the probability of the most likely sequence through that model to produce the specified output. The system then identifies the spoken word with the digit/model which has the highest associated probability.

The system described in U.S. Pat. No. Re 33,597 is based on a discrete HMM with vector quantisation. In other words, each frame is approximated by one of a fixed set of possible audio vectors. In general however, it has been found preferable to use HMMs with continuous probabilities for speech applications. In such an HMM, the output distribution B for each state is continuous, and so can be used directly to calculate the probability of any input frame. This calculation is normally performed on a set of features, typically LPC coefficients which are extracted from an audio frame. Usually the B distribution for each feature or parameter is assumed to be Gaussian, with specified mean and variance, although more complicated distributions (often mixtures) can also be used. Therefore the B matrix specifies the distribution parameters (eg mean and variance) for each of the features in an audio vector, for each state. The output probability is then determined directly for any input audio frame, by determining how similar its parameters (eg LPC coefficients) are to the mean values for that particular state. Note that the remainder of the recognition process is essentially the same for both continuous and discrete probabilities.

HMM recognition systems with continuous output probability distributions are described for example in EP 560378 and in "Recognition of Isolated Digits Using Hidden Markov Models with Continuous Mixture Densities" by L. Rabiner, B. Juang, S. Levinson, and M. Sondhi, p1211–1234, AT&T Technical Journal, Vol 64, No 6, July-August 1985.

Before an HMM can be used, it is necessary to derive the A and B probabilities, a process known as training the HMM. This can be illustrated using the HMM of FIG. 2 again, in which the HMM is trained to recognise a single isolated word. In order to do this, multiple recordings of the same word are collected, generally rendered by different speakers. If we represent aach recording by a sequence of "X"s and "Y"s (an extreme form of vector quantisation, which of course is technically unrealistic, but which does serve for illustrative purposes), for a set of five different recordings, we may have the following: XX, YXX, XX, XXX, YXX. The purpose of training is to select the A and B probabilities that are most likely to give this overall set of outputs. This cannot be done analytically, but rather an iterative approximation method must be used. Conceptually the process starts with a pair of sets of trial values for A and B, and determines which set of the pair is less likely to produce overall the observed outputs. This set of values is then discarded, and replaced by a new trial set. There are formal strategies available for selecting this new trial set in order to follow an optimisation process. The pair comparison process then repeats until convergence, i.e., no new trial values can be found which improve the likelihood of producing the observed training outputs.

The comparison of a trial pair of models can be appreciated with reference to the example of FIG. 2, in which the output probabilities for XX according to two different models having different A and B distributions were calculated. It is clear that Model 2 is more likely than Model 1 to produce the observation sequence XX. For training, the overall probability of Model 1 and Model 2 producing all five training recordings would be calculated (i.e., not only the output XX, but also YXX and XXX, taking into account their relative frequencies), with the model having the highest overall probability being preferred.

Further details about training HMMs can be found in U.S. Pat. No. 5,193,142, as well as most of the previously cited references (see especially the paper by Rabiner et al). Note that for a system designed to recognise a particular limited vocabulary (eg digits), it is desirable to try to select the A and B distributions not only to maximise recognition of a single word, but also to optimise discrimination between different words in the vocabulary.

Although HMM recognition system are designed to be capable of handling some variation in the pronunciation of a given word, in general it is considered that too large a variation reduces the recognition performance. Thus in a system which has a separate HMM for each word to be identified, it is often common to have separate models for significantly different pronunciations. For example, EP 642117 suggests using two models to handle the different pronunciations of "either". However, the drawback with adding such an extra model is that it reduces system performance. Thus there is an extra model to be trained, and during recognition a probability value must be calculated for the extra model. In systems which recognise only a limited number of words such as single digits, the overhead of adding an extra model (eg in German to handle "zwei" and "zwo" separately) is significant. It will also be appreciated that many speech recognition systems are used in real-time environments, in which it is particularly important to be able to maximise system performance.

It is an object of the invention to provide an improved speech recognition system. It is further an object of the invention to provide an improved system for the recognition of discrete spoken words.

SUMMARY OF THE INVENTION

Accordingly, the invention provides a speech recognition system for discrete words comprising a Hidden Markov Model (HMM), the HMM nominally being adapted to recognise N different words, characterised in that the HMM is trained to recognise M different words, where M>N, the M words being phonetically dissimilar from one another.

The invention exploits the fact, not hitherto appreciated, that although in many cases the size of the HMM used in speech recognition systems is effectively determined by the number of different words to be recognised, the HMM in practice is generally able to process a larger number of words without detriment to the recognition accuracy.

In a preferred embodiment, M is greater than or equal to twice N, which allows a substantial saving on model size to be achieved. This is particularly suited to a voice recognition system which handles N spoken digits (typically just single digits, i.e., N=10) simultaneously in two or more different languages. This is especially useful in countries (eg Switzerland) where multiple languages are spoken. It is difficult to be certain how large M can in fact be relative to N, but preliminary experiments seem to indicate that having M three times as large as N is certainly feasible without significant degradation of recognition performance.

Preferably N is less than 100, and often much smaller, eg between 10 and 20. Systems for recognising larger vocabularies tend to be based on sub-word units, such as phonemes, so that this technique is no longer applicable.

In the preferred embodiment, the HMM is structured with a predetermined number of states (S) per nominal word, thereby giving the HMM a total of N×S states. Typically the number of states is less than about 30. In general, increasing the number of states increases computational burden, but improves recognition accuracy, up to about 30 states, when no further benefit in recognition accuracy is obtained. If we imagine the states arranged in a grid having N rows and S columns, ideally each row in the grid corresponds to a different word. This can be assisted by configuring the HMM to have N allowable final states. In practice however, not all spoken renderings of a given word simply follow the row through the HMM, but instead follow a variety of paths. The set of paths for the given word are all then associated together. The invention recognises that this set of paths may in fact include paths for phonetically dissimilar words, and the HMM is still able to associate them with a single output.

The invention also provides a method of training a speech recognition system for discrete words comprising a Hidden Markov Model (HMM), the HMM nominally being adapted to recognise N different words, wherein the HMM is trained to recognise M different words, where M>N, the method comprising the steps of:

providing M sets of audio recordings, each set comprising multiple recordings of a respective one of said M words being spoken;

assigning N labels to the M sets of audio recordings, such that at least one of the N labels has two or more sets of audio recordings assigned thereto, said two or more sets of audio recordings corresponding to phonetically dissimilar words; and training the HMM by inputting each set of audio recordings and its assigned label.

Note that this training process effectively follows prior art procedure, except for the assignment of labels to two or more sets of audio recordings to allow the multiplexing or folding of M words onto N labels.

It is preferred that the step of training includes, for each audio recording, the steps of:

determining a path through the HMM for the audio recording; and associating the determined path with the label assigned to the audio recording, such that recognition can be performed by determining the training path most likely to output the word to be recognised which can then be equated to the label associated with said most likely path.

An embodiment of the invention will now be described in detail by way of example only. A brief description of the drawings in this application is as follows:

FIGS. 6a and 6b are examples of sets of words and/or digits used to train a single HMM in accordance with the present invention.

DETAILED DESCRIPTION OF THE PREFERRED EMBODIMENTS

Figure 3:
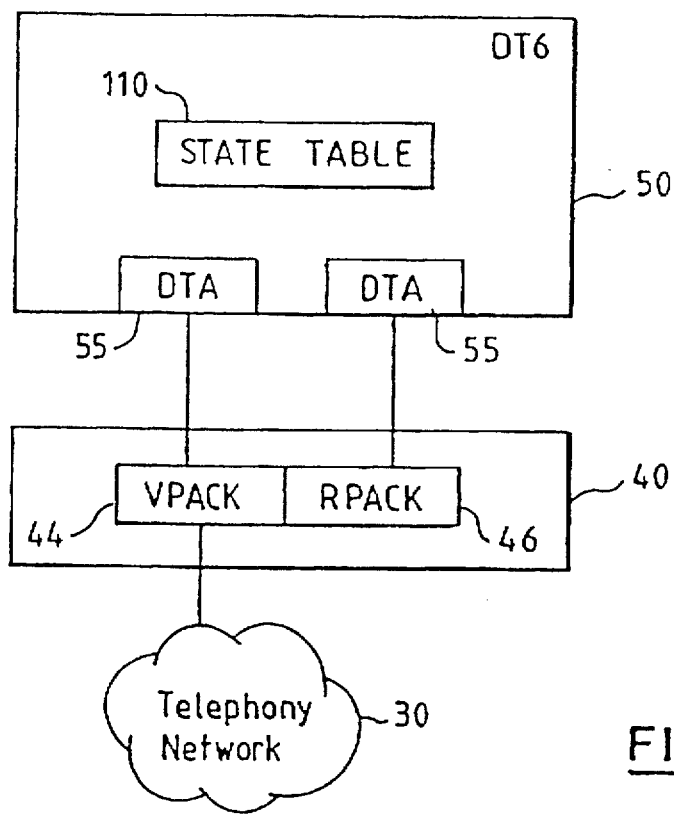
FIG. 3 is a schematic diagram of a voice processing system.

FIG. 3 provides a schematic diagram of a voice processing system incorporating a speech recognition system; the illustrated model is the DirectTalk/6000 system available from IBM Corporation. This system comprises a general purpose purpose workstation 50 (in fact a RISC System/ 6000 computer), and a digital trunk processor (DTP) 40, which is used to provide a (digital) interface between the workstation and the telephone network 30. The particular DTP shown includes two units, the first designated as a VPACK 44, the second as an RPACK 46. Both of these units essentially provide digital signal processing capability, and are attached to the workstation through respective digital trunk adapter (DTA) cards 55. The VPACK represents the actual interface to the telephone trunk, and provides various telephony functions such as tone detection, data compression etc. The RPACK provides a speech recognition function as described in more detail below. Note that logically the RPACK has nothing to do with the telephony interface, and so its location on the DTP is simply a result of hardware convenience. Running on the workstation are the AIX operating system and the DirectTalk/6000 software, plus a state table 110 which effectively represents a user-developed application.

It will be appreciated that there are many possible variations on the hardware configuration shown in FIG. 3. For example, the DTP may include other VPACKS or RPACKS, and the two DTAs may be replaced by a single Digital Trunk Dual Adapter. Further details about the DirectTalk/6000 system can be found in the IBM Callpath DirectTalk/6000 General Information and Planning manual (reference GC22-0100-04) and other manuals listed therein. Moreover, it will also be appreciated that other voice processing systems may have widely differing configurations, for example, having the function of the DTP included on one or more adapter cards in the workstation.

A typical operation of the voice processing system of FIG. 3 is as follows. An incoming call is received over the telephony network, and the voice processing system, under the control of the state table, determines that the caller does not have a DTMF telephone (this determination can be made for example through knowledge of the calling or called number, or by the caller failing to depress a tone key when requested to do so). In such circumstances, the voice processing system elects to utilise voice recognition to interpret the caller's input. This is done by forwarding the appropriate audio signal to the RPACK, which performs a speech recognition task on this audio signal, and returns the spoken string to the state table application. It will be noted that the large majority of voice recognition systems used in telephony are speaker independent; in other words, such systems are trained to recognise vocal input from any speaker. This is accomplished by training the machine on vocal samples from as wide a range of speakers as possible.

The RPACK software performs speech recognition using an HMM and is based on technology available from Centre National d'Etudes des Telecommunications (CNET), France. It provides recognition of a limited number of isolated words, such as single digits. For recognition, the RPACK requires both data, referred to as the "vocabulary"—effectively the A and B parameters for the HMM for a given set of words plus information about which paths correspond to which words (see below), as well as code to implement the voice recognition process. This data and code is stored on the workstation, and downloaded to the RPACK at install/initialisation time.

Figure 4:
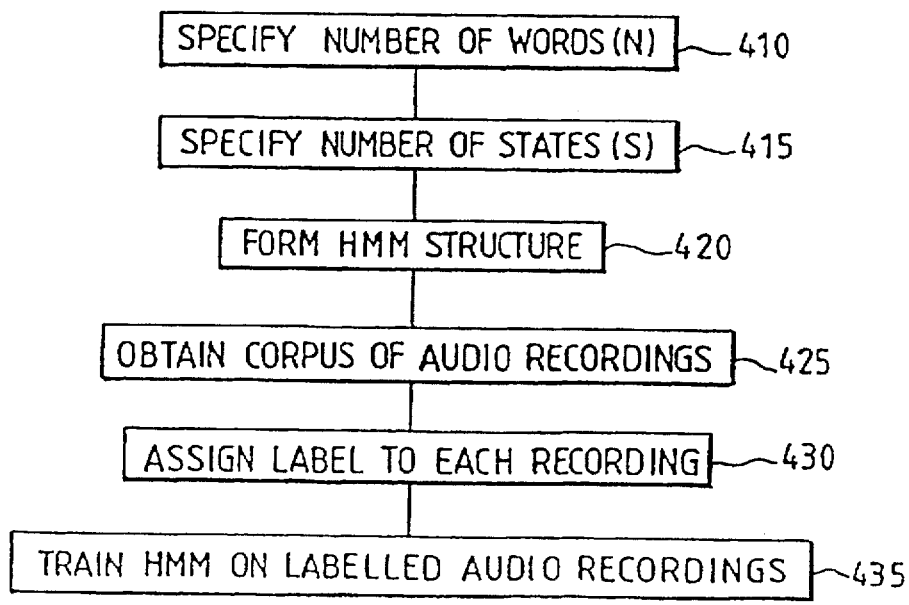
FIG. 4 is a schematic diagram showing the training of a speech recognition HMM.

Before the HMM in the RPACK can be used for voice recognition, it must be appropriately trained, using the process shown in FIG. 4. This will be discussed first in relation to a conventional (i.e., prior art) trained recognition system. It will be assumed that the system is to be trained to recognise spoken single digits. This is a very common use in the telephony environment, to allow input to voice processing machines etc by callers who do not have DTMF (touchtone) telephones. The model is therefore informed of the number of words to be recognised (=10) (step 410). It is also necessary to specify the number of states (step 415). Note that the more states are used, the more complex the HMM and hence the greater the computational power need to perform recognition. On the other hand, increasing the number of states also improves recognition accuracy, at least up to about 30 states beyond which no significant enhancement is obtained. In a preferred embodiment, 19 states are used per word, which provides an acceptable compromise between response time, which must be relatively fast in a real-time telephony environment, and recognition accuracy.

Figure 5:
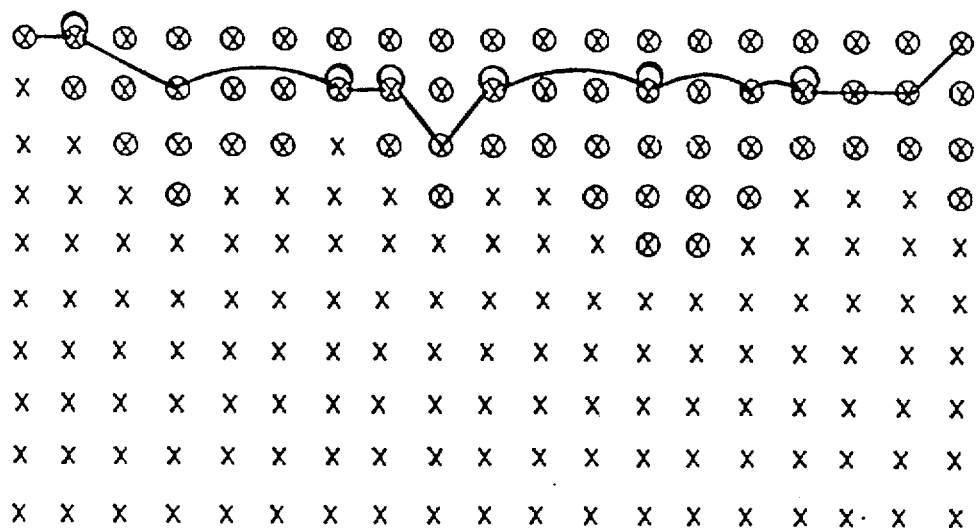
FIG. 5 is a diagram illustrating the structure of an HMM used in a speech recognition system.

Once the number of words and states have been specified, the HMM can be formed (step 420), adopting the grid-like configuration shown in FIG. 5. Thus the grid has one row for each word to be recognised, and one column for each state, so that in the embodiment being discussed, there are 10 rows (words) and 19 columns (states per word), giving a total of 190 states. The HMM of FIG. 5 is analogous to systems which have a separate HMM for each word, but can be regarded as incorporating all these separate HMMs in parallel into a single bigger HMM for increased flexibility.

The HMM is now ready to be trained. This is accomplished by obtaining a corpus of training data (step 425), comprising a set of audio recordings for each word to be recognised. Typically these recordings might be sampled at 8 kHz, with 8 or 16 bits per sample. The number of recordings in each set should be quite large (eg 800+), by different speakers. Also the recordings should be made in the same environment as the intended application in order to minimise the effect of any distortions; thus for use in a telephony system, the recordings should be made over the telephone. Each recording is associated with a label (step 430), representing the spoken digit.

The training data is then presented to the HMM (step 435), from which the A and B model parameters are derived. Since this training procedure is known in the prior art, only an overview will be given. Effectively each recording is broken up into vectors, and the relevant features (eg LPC or cepstrum coefficients) required by the model are then calculated. Each recording is broken up into 19 vectors, corresponding to the nominal number of states per word (this match helps to achieve good recognition, but is not essential). Then for each recording, an appropriate path through the HMM is determined. The model is constrained so that right to left transitions are not permitted, although left to right jumps are not restricted in size. A path commences on one of the nodes in the left-most column, and terminates on one of the nodes in the right-most column.

Initially, all the states are unpopulated, but these fill up as the model is trained with more recordings. This is shown schematically in FIG. 5, in which populated states are indicated by a circle around them. Essentially the model tries to add new recordings to the existing states, perhaps with some modification of their parameters; one such path is shown in FIG. 5. However, if the new recording differs too much from these existing states, then a path including hitherto unpopulated states must be employed. The assessment of difference or distance between states/vectors is discussed for example in "Speech Recognition and Statistical Approach: CNET's Experience", by Gagnoulet and Jouvet, p267–274, Traitement du Signal, Vol 7, No 4 (1990), and "Automatic Adjustments of the Markov Models Topology for Speech Recognition Applications over the Telephone" by Jouvet et al, p65–70 in Speech Recognition and Understanding, Procs of NATO Advanced Study Institute, Cetraro, Italy, 1990.

Once all the states have been populated, then new recordings must be accommodated into these existing states as best as possible, with modifications to the output/transition probabilities as appropriate. This process continues until all the available training data has been incorporated into the HMM. The path followed for each recording is stored, together with the label associated with that path.

Figure 1:
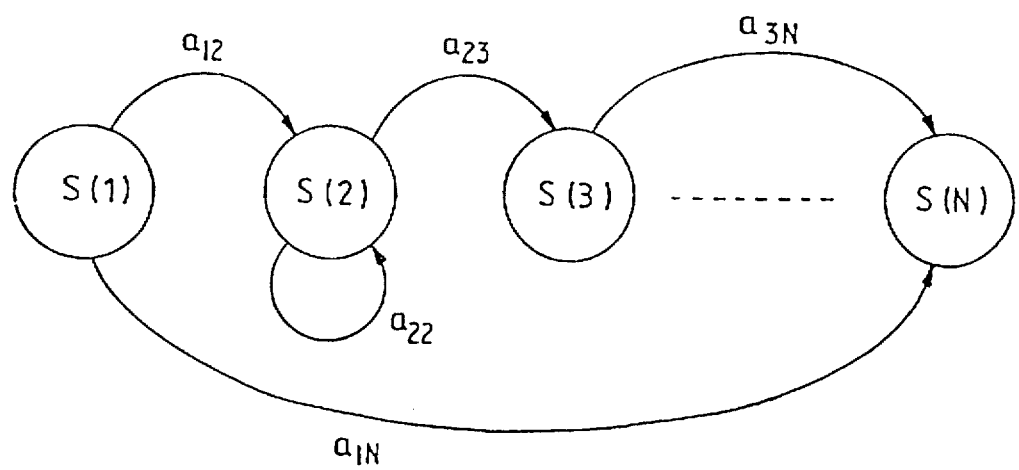
FIGS. 1 and 2 illustrate examples of Hidden Markov Models as known in the prior art.
Figure 2:
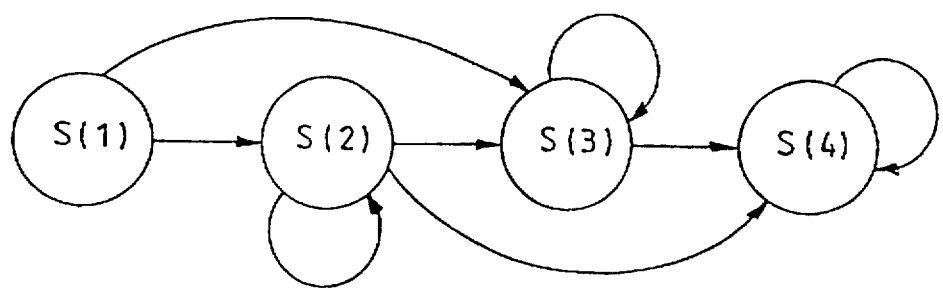

After training, the HMM may be used for recognition as follows. A word to be recognised is sampled and converted into audio vectors, each comprising a set of features, as for the training data. Then, for each of the paths derived from the training data, the probability of this path producing an output corresponding to the word to be recognised is calculated, by simply computing the transition and output probabilities for each state along the path (in the similar manner to that described earlier for FIG. 2 and Models 1 and 2). The word to be recognised is then assigned the same label as the path for which the highest probability is obtained. Note that to improve calculation efficiency, a threshold probability is set, and if the probability for a particular path falls at any stage below this threshold, then the path is discarded before completion.

The inventors of the present application have determined that the HMM shown in FIG. 5 can in fact be used to recognise multiple vocabularies. For example, the same HMM can be employed to recognise digits in both French and German. In order to achieve this unexpected benefit, training data are collected for both languages. However, corresponding digits from the two languages are assigned the same label; in other words, "eins" and "un" share a label, as do "zwei" and "deux", and so on. The training data is then presented to the HMM as before, as simply ten sets of samples, but now each set in fact includes two different groups, one representing the French version of the number, the other representing the German version of the number. As before, the training recordings are used to populate the HMM in order to derive the output and transition distributions.

By way of example, FIG. 6a illustrates sets of words and/or digits used to train a single HMM in accordance with the present invention. N(i) denotes a specific word or digit (i.e., label) in a given set N having i number of words or digits that the HMM is adapted to recognize. Each column (e.g., M1 and M2) represents a different language (e.g., French and German) and the word or digit to be recognized Mk(i) in such language which corresponds to the word or digit (i.e., label) N(i). Each row corresponds to each set of training data which is used to train the HMM (i.e., the label N(i) and the corresponding phonetically dissimilar words Mk(i) which are assigned the same label N(i).

This HMM utilises the same method for the recognition of digits as described above; ie, the probabilities of each of the training paths outputting a digit to be recognised are determined, and the model outputs the label corresponding to the path having the highest probability. It will be noted that this label depends only on the digit, and not on the language in which it was spoken, since both languages share the same range of labels. However, in practice this often suffices for controlling the operations of a voice processing system, and is particularly beneficial in countries and geographical regions having multiple languages, where it is difficult to predict with certainty the language in which any particular caller will respond.

The present invention therefore exploits previously unappreciated power and flexibility in HMMs in order to support simultaneous vocabulary sets in an HMM of limited size. Prior art systems have supported shared labelling of words such as "zwei" and "zwo" in German, but only for instances of phonetic similarity ("zwei" and "zwo" differ only in the final vowel), and for a small fraction of words in the recognition vocabulary. It will be noted by contrast that in the embodiment described above, all the words in the recognition vocabulary have a shared label (pairing the digits as spoken in two different languages), and moreover that in the majority of cases, there is little or no phonetic similarity between the paired words (eg "deux" and "zwei").

The prior art by contrast would have supported two languages either by storing two separate models, and loading whichever was appropriate for a particular language, or having a model that is twice as big (i.e., to handle 10×2=20 words). The former of these prevents simultaneous handling of two different languages, and having to swap between languages is time-consuming and inconvenient. The latter technique adds to the computational burden of the recognition, so that either response time or processor power (and expense) must be increased.

There is in fact some increased computational complexity arising from the approach of the present invention, in that there is likely to be a larger number of possible paths from the training data. Thus with a single language, the paths will typically cluster into one group, with lots of repeated paths. However, with two languages, the paths will cluster into two different groups, in effect reducing the proportion of repeats. This means that there are more candidate paths to be evaluated for any given word to be recognised. However, it is likely that many of these can be quickly eliminated from the recognition process as falling below the threshold probability as described above. Certainly there has not been any noticeable degradation of recognition performance arising from the simultaneous support of two languages, compared to performance when the HMM was trained on only a single language.

An important advantage of the invention is that it does not require any changes to the HMM or recognition system, and so is compatible with existing equipment. The only difference is in the presentation of the training data to the HMM, with the sharing of labels between phonetically dissimilar words, and the consequential changes to the A and B parameters.

Note that in the present embodiment, the A and B parameters are contained within the HMM provided by CNET, and so are not directly accessible to the inventors of the present application. Whilst this does not prevent use the HMM as described above, it does make it difficult to determine exactly how the HMM manages to incorporate the increased vocabulary. However, it is conceivable that this is achieved by exploiting any commonality in sounds between different digits as spoken in any one language, which would effectively introduce a degree of redundancy into the single language HMM, together with optimisation of the output distributions to permit such node sharing.

This leads to the question of how much compression or multiplexing the invention can provide. Thus the example above has discussed having two sets of vocabularies folded into a single group of labels; however preliminary investigations by the inventors have indicated that this can probably be extended to having at least three sets of vocabularies folded into a single group of labels, and possibly more, without significant deterioration in recognition accuracy. One possibility might be to try to optimise the HMM to support such multiple vocabularies, for example by using output distributions that are specifically designed to support multiple vocabularies by allowing bi-modal or tri-modal distributions (although there may be some restrictions on the form of distributions to ensure model convergence during training).

Although the invention has been described primarily with respect to the recognition of digits in different languages, it will be appreciated that it is of benefit whenever two distinct sets of words are to be recognised. For example, referring to FIG. 6b, an application to collect sales order information over the telephone may have a first question requiring size details ("small", "medium", and "large"), and a second question requiring colour details ("red", "blue", "green"). In accordance with the teachings of the present invention, these two sets of responses could be effectively multiplexed onto a single three-word HMM, rather than requiring two separate HMMs as in the prior art. Clearly, if the number of possible responses to the two questions differed, then the HMM would nominally equate to the greater number of responses, with some labels in the HMM being used only in relation to the question with the greater number of responses. Note also that many voice processing systems can handle multiple telephone lines in parallel, so it is quite likely that some callers will be answering the first question, whilst others are answering the second. In such circumstances, it is particularly beneficial for a single HMM to be able to handle responses to both questions.

In addition, although the speech recognition system of the present invention has been described in terms of a telephony environment, it is not so limited. For example, it might be included in a control unit for a television set which changes channel responsive to user voice commands (avoiding the frustration of not being able to find a remote control unit); another possibility would be inclusion in a ticket machine, into which a customer speaks the intended destination. It will therefore be recognised that the system of the present invention finds utility in a great variety of speech recognition applications.

We claim:

1. A speech recognition system for discrete words, comprising:

interface means for receiving incoming voice signals;

processing means, operatively coupled to said interface means, for processing said incoming voice signals;

program means, responsive to said processed voice signals from said processing means, for performing speech recognition on said processed voice signals, said program means using a single Hidden Markov Model (HMM), said HMM nominally being adapted to recognise N different words, characterised in that said HMM is trained to recognise M different words, where M>N, said M words being phonetically dissimilar from one another.

2. The speech recognition system of claim 1, in which M is greater than or equal to twice N.

3. The speech recognition system of claim 2, wherein said M words comprise N digits from a first language, and N corresponding digits from a second language.

4. The speech recognition system of claim 3, in which N is less than 100.

5. The speech recognition system of claim 2, in which N is less than 100.

6. The speech recognition system of claim 1, in which the number of states per nominal word is S, whereby the HMM has a total of N×S states.

7. The speech recognition system of claim 6, in which the HMM has N allowable final states.

8. The speech recognition system of claim 7, in which S is less than 30.

9. The speech recognition system of claim 6, in which S is less than 30.

10. The speech recognition system of claim 1, in which N is less than 100.

11. A computer implemented method for training a speech recognition system for discrete words, comprising the steps of:

providing a single Hidden Markov Model (HMM);

providing M sets of audio recordings, each set including multiple recordings of a respective one of said M words being spoken;

assigning N labels to the M sets of audio recordings, such that at least one of the N labels has two or more sets of audio recordings assigned thereto, said two or more sets of audio recordings corresponding to phonetically dissimilar words;

inputting each of said sets of audio recordings and assigned N labels into said speech recognition system;

determining a training path through said HMM of said system for each of said inputted audio recordings; and storing said determined training path for each of said audio recordings together with said N label assigned to each of said audio recordings, whereby speech recognition of a word can be performed by determining said training path most likely to output said word to be recognised and then equating said word to be recognised with said N label associated with said most likely determined path.

12. The method of claim 11, in which M is greater than or equal to twice N, and each label has two or more sets of audio recordings assigned thereto.

13. The method of claim 12, wherein said M words comprise N digits from a first language, and N corresponding digits from a second language.

* * * * *